(12) United States Patent
Smith et al.

(10) Patent No.: US 12,019,746 B1
(45) Date of Patent: Jun. 25, 2024

(54) ADAPTIVE MALWARE BINARY REWRITING

(71) Applicant: UT-Battelle, LLC, Oak Ridge, TN (US)

(72) Inventors: Jared M. Smith, Oak Ridge, TN (US); Luke Koch, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 190 days.

(21) Appl. No.: 17/851,229

(22) Filed: Jun. 28, 2022

(51) Int. Cl.
  *G06F 21/56* (2013.01)
  *G06F 21/14* (2013.01)

(52) U.S. Cl.
  CPC ............ *G06F 21/564* (2013.01); *G06F 21/14* (2013.01)

(58) Field of Classification Search
  CPC .............................. G06F 21/14; G06F 21/564
  See application file for complete search history.

(56) References Cited

U.S. PATENT DOCUMENTS

| | | | |
|---|---|---|---|
| 9,100,389 B2* | 8/2015 | Mahaffey | H04L 63/10 |
| 9,235,704 B2* | 1/2016 | Wootton | H04W 4/00 |
| 9,858,414 B2* | 1/2018 | Green | G06F 21/566 |
| 9,996,694 B2* | 6/2018 | Sethumadhavan | G06F 21/52 |
| 10,192,052 B1* | 1/2019 | Singh | G06F 21/562 |
| 11,461,468 B2* | 10/2022 | Healy | G06F 18/22 |
| 11,522,885 B1* | 12/2022 | Maknickas | H04L 63/145 |
| 11,714,905 B2* | 8/2023 | Ducau | G06N 20/00 726/24 |
| 11,856,003 B2* | 12/2023 | Kutt | H04L 63/145 |
| 11,863,587 B2* | 1/2024 | Jiang | H04L 63/20 |
| 2015/0096024 A1* | 4/2015 | Haq | H04L 63/1416 726/23 |
| 2022/0147815 A1* | 5/2022 | Conwell | H04L 63/1416 |

OTHER PUBLICATIONS

Anderson, Hyrum S., et al. "Evading machine learning malware detection." black Hat 2017 (2017). pp. 1-6.
Fang, Yong, et al. "DeepDetectNet vs RLAttackNet: An adversarial method to improve deep learning-based static malware detection model." Plos one 15.4 (2020): e0231626. pp. 1-32.

\* cited by examiner

*Primary Examiner* — Viral S Lakhia
(74) *Attorney, Agent, or Firm* — LEMPIA SUMMERFIELD KATZ LLC

(57) ABSTRACT

An adaptive malware writing system includes a targeting engine that classifies malware candidates as a malicious candidate or a benign candidate through a surrogate model. The surrogate model assigns a weight to each byte of the malware candidates through a saliency vector. The sum of the weights render a malware classification score. An alteration engine alters a binary form of the malware candidates classified as malware by executing a functional analysis that traces application program interface calls and memory. The alteration engine alters the binary form of the malware candidates classified as malware to render a synthesized malware. The malware analysis determines if the synthesized malware is operational by comparing an image of the synthesized malware to an image of at least one of the plurality of malware candidates. A target classifier engine identifies the vulnerabilities of a targeted computer.

20 Claims, 8 Drawing Sheets

ADAPTIVE MALWARE BINARY REWRITING

1. STATEMENT REGARDING FEDERALLY SPONSORED RESEARCH AND DEVELOPMENT

These inventions were made with United States government support under Contract No. DE-AC05-00OR22725 awarded by the United States Department of Energy. The United States government has certain rights in the inventions.

2. TECHNICAL FIELD

This disclosure relates to intrusive software and more specifically synthesizing and identifying software that causes malicious operations.

3. RELATED ART

There are many types of intrusive programs that intentionally disrupt computers. Some leak private information, some gain unauthorized access, and others deprive users access to their computers.

Many security programs monitor and prevent infections caused by intrusive software by scanning files to detect malicious code. Unfortunately, malware attributes are often not known before an infection occurs.

DESCRIPTION OF THE DRAWINGS

The system may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION

Figure 1:
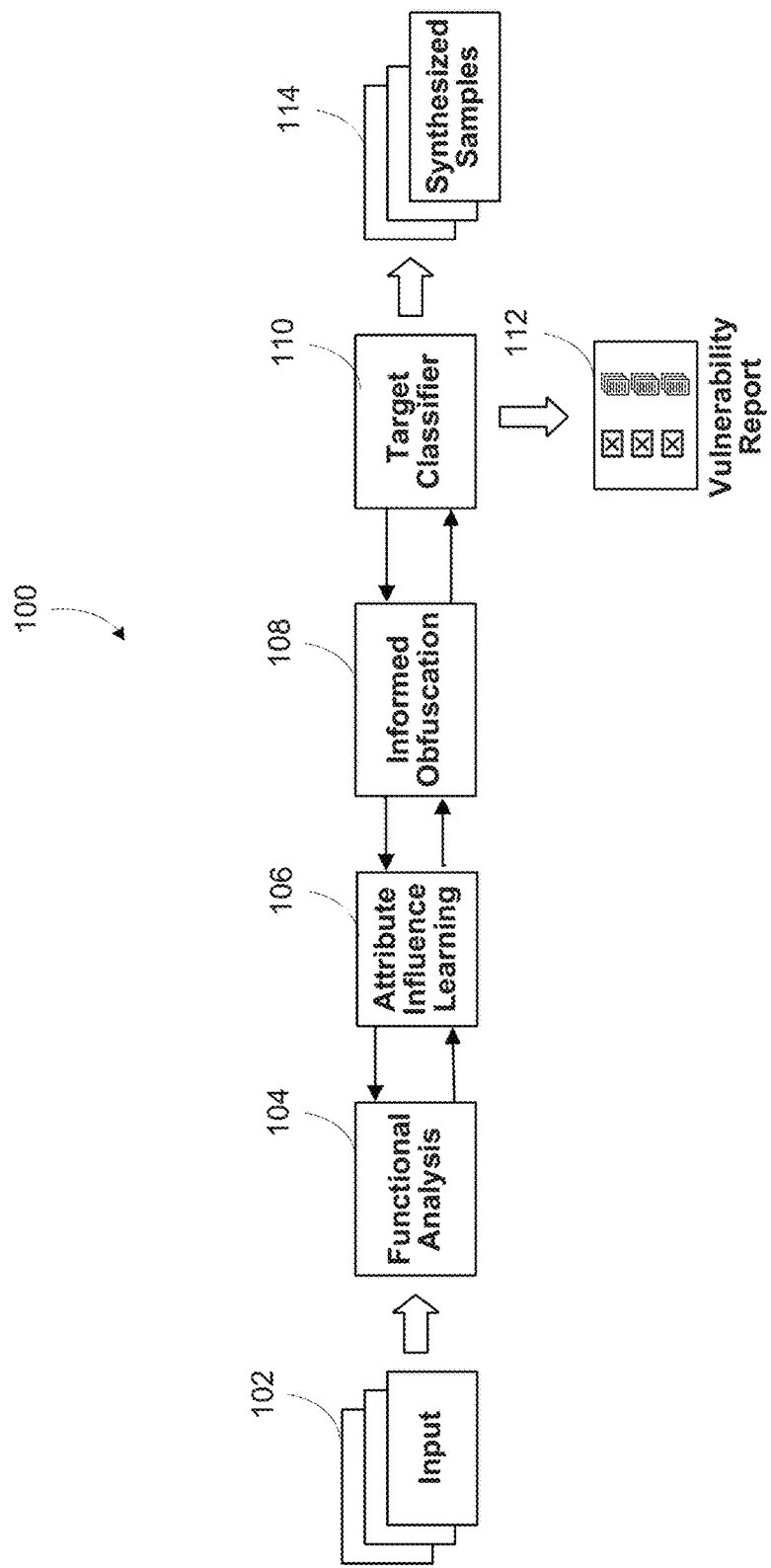
FIG. 1 is a flowchart of an adaptive malware rewriting process.

An adaptive malware rewriting system (e.g., referred to as a system(s) or an apparatus or protocol(s)) protects computers from intrusive software and targeted attacks. The systems identify malware through machine learning algorithms and/or dynamic behavior tracking. The systems identify threats by generating new forms of malware and/or training data that identify malware instances, variants, and/or their families. The modified malware instances and training data supplement systems including traditional static and/or signature based malware detectors. By training machine learning models and/or dynamic tracking detectors on detected and/or synthesized malware, their variants and/or their families, the systems identify malware threats regardless of malicious software's origin or execution sequences.

The system's machine learning models detect and identify threats also using dynamic models that process attributes extracted from file-less malicious activity and/or malicious files. Tuning on known, and/or new modified malware forms and their variants, the systems detect and identify malware registry changes, inter-process communications, network activities, changes in targeted systems' processing consumption, malware's start up sequences, malware's termination sequences, and/or etc., for example, instead of training exclusively on previously known malware instances. When malware identifications occur, some infected systems are automatically isolated and/or automatically returned or rolled back to pre-infection states to restore the infected systems to its prior uncompromised operating states.

The system's machine learning algorithms 820 (shown in FIG. 8) also learn how to identify infected software that is concealed or cloaked by other software. Using a knowledge base 824 and an inference engine 826, for example, some alternative systems detect infections that are not always contained in the machine learning's training set or its exposure to malware samples but are detected by machine learning predictions. An exemplary system processes input with rules constrained by a knowledge base 824 that reach conclusions and/or render predictions that the systems act upon. Some systems generate malware profiles 818 that store the preferences, settings, and/or different attributes and/or processes of known and/or synthesized malware, their variants, and/or their family traits. The malware profiles 818 allow the targeted computer to be maintained or restored when the targeted computer defends against or recovers from a cyber-attack. The attributes and/or processes contained in the malware profiles 818 may identify malware's execution cycles from its interactions with a host and/or targeted operating systems to its executions and/or interactions with other higher level software and/or hardware applications.

Some malware profiles 818 store attributes that identify instantaneous and/or cumulative behaviors at points in time or across a range in time (e.g., that ranges in seconds, minutes, hours, and/or days, etc.) that can identify malicious attacks intended to evade traditional malware detectors. Some systems generate high quality training data that allow the machine learning algorithms 820 to generate new predictions on new data. Some machine learning models identify malicious code by applying machine learning heuristics that do not execute step-by-step analysis making the malicious software identifications quicker and more accurate. The heuristic strategies including the detection of rules and or commands associated with a malicious intent that allow the systems to make quick predictions and/or identifications within predetermined accuracy ranges.

The machine learning algorithms 820 are trained on classes of malware specifically engineered and/or synthesized to evade classifications by traditional malware detection systems. Some samples are generated by automatically making semantic alterations to malware instances, their families and/or variants. Semantic alterations are defined as changes to the malware instance or the code that causes malicious use of native legitimate computer tools and/or resources that do not compromise the malware's original or intended malicious function or a cyber-attack but conceal their identity. Notably, these alterations are not always pre-selected and are not always made at random. An optimization function is used by some systems to efficiently search for alterations that detect malware misclassifications. The terms alteration, perturbation, and/or obfuscation are used interchangeably in this disclosure. Obfuscation refers to a process that attempts to conceal a malware's intended purpose, while perturbation refers to a process that alters malware. In this disclose, the term alteration refers to processes that conceals a malware's intended purpose and/or a processes that alter malware and/or synthesized malware and/or its variants without altering the malware's intended purpose or its processes.

To reduce the processing bandwidth required to identify operational malware prone to misclassifications, the systems apply a random sample contraction that iteratively and automatically reduces the search set for the alterations that yield the sought after operational malware and/or their variants that are prone to a misclassification. The optimization engine begins by automatically searching an entire sample space of an input or synthesized malware set, including its variants and/or its family, and randomly analyzes malware by selecting and processing a predetermined number of altered samples, and thereafter, contracting the sample size containing the synthesized operational misclassifications. The optimization calculations continue recursively until operational malware prone to misclassifications and any associated synthesized operational malware, variants, and/or its family members are identified or substantially identified in the sample. The calculations are thereafter repeated automatically, continuously and/or periodically so that the entire synthesized malware sample set is screened and an update of the malware and/or its attributes is written to a memory 804 to ensure that the machine learning algorithms 820 can train on these forms and/or precisely track and/or identify the operational malware instances, variants, its family members, and/or etc. that are likely to be misclassified when traditional malware detection systems are exposed to them. In some systems, the recursive algorithm runs in real-time updating malware misclassifications continuously. The term real-time refers to systems that update information at the same rate the systems receive data, enabling the systems to direct and control the identification and/or updating processes.

Some adaptive malware rewriting systems are modular and generate and/or process all types of semantic malware alterations. Some alteration types are "dropped in" or downloaded from external/remote sources as the altered malware and/or alterations are developed externally. While some alternative systems generate and process a few alterations that only alter a very small percentage of a non-infected instance or code that causes the malicious activity; other systems generate more alterations that are the result of more detailed analysis. Fortunately, some systems are used with external analysis tools that allow the systems to synthesize many alterations and generate many synthesized malware.

Some systems provide a prediction, identification, and/or solutions to each malicious vulnerability. The machine learning algorithms 820 process a large number of altered malware, newly generated malware, variants, and/or their family members (also referred to as synthesized malware and/or synthesized malware samples) to develop a resistance to synthesized malware samples. By generating a large volume of synthesized malware samples using a variety of alteration techniques, the systems generate malware samples and training datasets that the machine learning algorithms 820 process to detect patterns that map input data attributes to a malware target to render one or more machine learning models 208 (shown in FIGS. 2 and 8). The use of one or more machine learning models 208 that may include binary classification models, multiclass classification models, regression models, and/or etc. and single or multiple training data sources increase malware detection sensitivity in the targeted systems and reduce the threats of malware exposure. A malware family is a program or set of associated instructions with a predetermined amount (e.g., five percent or more) of software code or content overlap to be considered part of the same group. The reference to group generally refers to more than a single piece of malware because it includes malware as it alters over time, creating new malware instances that retain family traits.

In creating the machine learning models 208, some systems include an end-to-end synthesized malware sample generator 100 (also referred to a data source generator or malware generator) shown in FIG. 1. The malware sample generator 100 alters malware binary files and/or stripped binary files instead of modifying malware source code. By not generating source code from malware binary files or machine code, the systems avoid the processing burden of decompiling portions of the malware code to synthesize malware candidates 828 and their variants. When generating malware candidates 828 and their variants, the system executes optimizations through an optimizing engine 812 to detect those malware candidates 828 and their variants that are operational. By optimizing the selection of synthesized malware and variant candidates 828 that are operational, some systems make widespread detections based on smaller sample sets because some operational malware share attributes. Optimized selections limit the aggregation of malware training data and/or malware samples to unique malware samples (e.g., identified by analysis or comparisons), which improves the speed and accuracy of malware detections and classifications. Optimization limits the mappings of input attributes to targeted malware patterns. The system also ensures the operational functionality of the synthesized malware variant candidates to ensure that the synthesized malicious perform some harmful or undesirable or malicious activity. It may be intended or not. A malicious activity may attempt to achieve persistence, exfiltrate data, and/or communicate with an external destination such as a server, for example. By ensuring the synthesized malware candidates 828 and their variant candidates perform harmful and/or malicious activity, the systems ensure that the malware instances and data used to train and/or develop the machine learning models discover and learn the patterns and/or attributes that enable the systems to identify and/or predict malware occurrences, and in some applications, isolate that malware and/or rollback targeted systems to pre-infection states.

Figure 8:
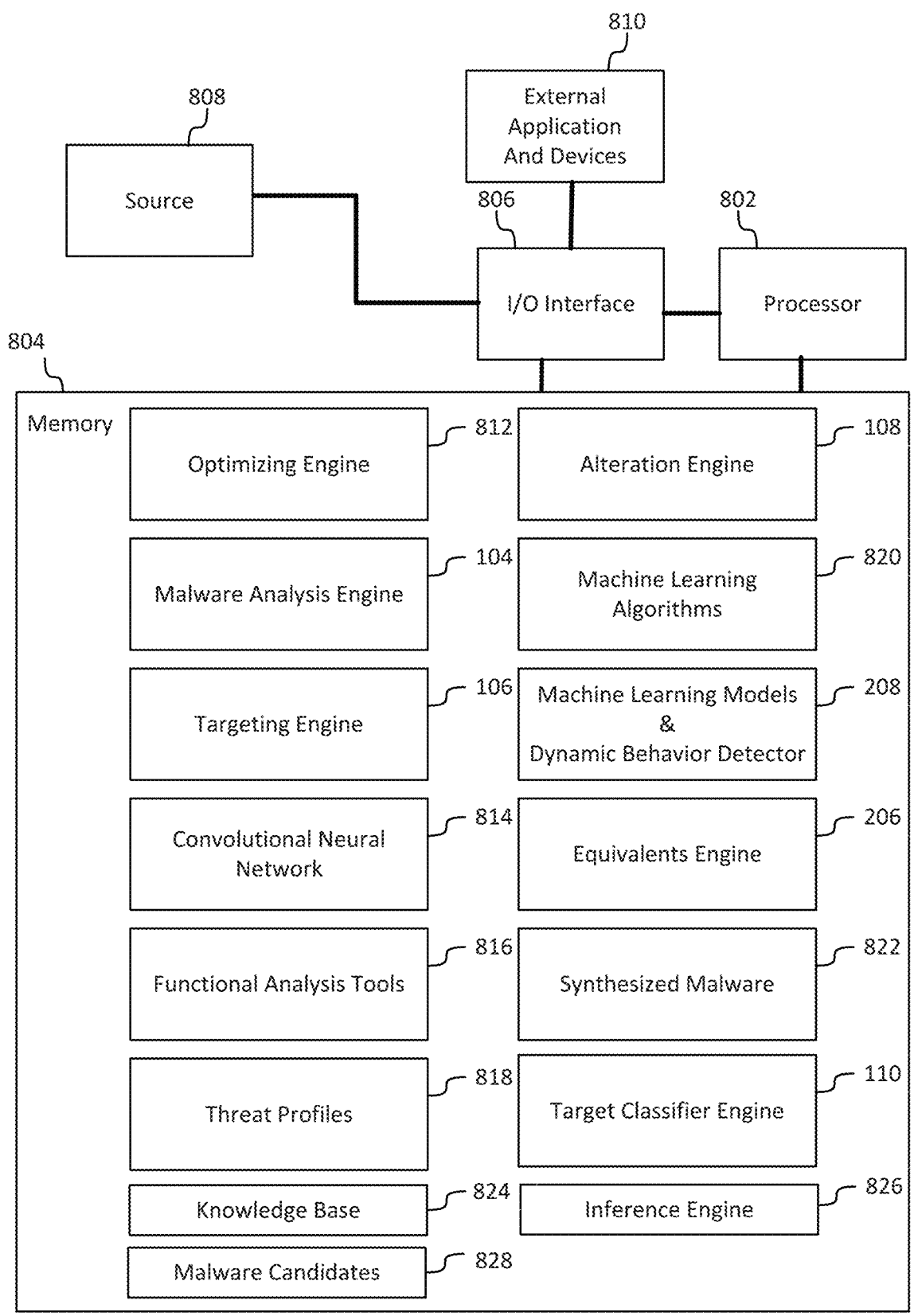
FIG. 8 is an alternative adaptive malware rewriting system.

FIG. 1 is a flowchart of an adaptive malware rewriting process. The process executes in a reoccurring processing loop until a predetermined condition is met. In FIGS. 1 and 8, an end-to-end synthesized malware input generator 100 consumes input 102 such as malware instances and renders operational synthesized malware samples 822. Following the processing executed by the malware analysis engine 104, which is explained below, the system executes an attribute influence learning analysis through a targeting engine at 106. The targeting engine 106 optimizes the systems' identifications of malicious malware candidates 828 through a surrogate model. The surrogate model comprises a convolutional neural network 814 that classifies files and/or file-less malware as either malicious or benign candidates. Each altered instance is processed by the convolutional neural network 814 that renders a malware classification score and/or a saliency vector. When the malware classification score (also referred to as the score) is above a predetermined detection threshold, the surrogate model classifies the file or file-less malware as malicious.

The saliency vector expresses the weights the surrogate model assigns to each byte in the binary file or file-less malware during the targeting engine's 106 classification. The greater the weight, the more influence the byte has on the malware classification score. By this processing, the system learns which individual bytes to alter to reduce the classification score. The objective of the targeting processing is to minimize the amount of alterations the system performs to achieve the greatest shift in a malware classification score that is calculated by summing the assigned weights. Once the malware classification score equals and/or drops below the predetermined detection threshold, the surrogate model classifies the file and/or file-less instances as not malicious despite their malicious nature and/or function. Due to the transfer property between the surrogate model and known malware detection schemes, a file or file-less malware instance that succeeds in deceiving the convolutional neural network 814 will also deceive other traditional malware detectors including those that screen malware, and remediate against malware, whether automatically and/or manually executed.

In FIG. 1, an informed obfuscation occurs by an alteration engine 108 (also known as a perturbation engine and/or obfuscation engine) that executes a binary instrumentation on the malware bytes prioritized by the saliency vector that are classified as malware. Because some malware instances occur as binary or stripped binary in their native forms or state rather than as source code, the systems process binary input. Using functional analysis tools 816 (shown in FIG. 8), the alteration engine 108 alters the binary malware in their native forms based on a functional analysis executed by the functional analysis tools 816. The functional analysis tools 816 indicate where, and in some alternative applications, how to alter the malware code, which in some cases, significantly alter the malware.

Some alternative functional analysis tools 816 trace application program interface (API) calls and general behavior of the file and distill the calls into high level information and signatures (that are then modified by the alteration engine 108 in some applications). Some alternative functional analysis tools 816 dump and analyze network traffic, even when encrypted with secure socket layer/transport layer security (SSL/TLS). With native network routing support, some functional analysis tools 816 drop all traffic or route it through an Internet service simulation software suite, a network interface, or a virtual private network (VPN) (that are then modified by the alteration engine 108 in some applications) that may run the malware in a sandbox. Sandbox evading malware may be monitored by prolonged analysis, stimulating human interactions (e.g., simulating mouse clicks or user movements) in a sandbox, adding real hardware artifacts to the sandbox such a retrieving hardware information (e.g., retrieving or simulating the retrieval of the hard disk's size, recent file accesses, CPU operating numbers, operating system version, current memory volume, etc.), use a multi-sandbox arrays that add features to the sandbox to simulate open systems, etc. Other alternative functional analysis tools 816 execute advanced memory analysis and virtualizations and execute random or predetermined modifications of the infected virtualized system by executing an open source memory forensic framework (e.g., analyzing the contents of memory and/or comparing contents to expected contents) through software as well process patterns by analyzing memory granularity using tools that identify and classify malware samples through pattern matching (that are modified by alternation engines 108 in some applications). Other alternative functional tools execute behavior computations based on computational semantics. Virtualization refers to creating a simulated, or virtual, computing environment as opposed to a physical environment. Virtualization includes computer-generated versions of hardware, operating systems, storage devices, etc. Each virtual instance can then interact independently and run different operating systems or applications while sharing the resources of a single host machine.

To ensure the input and/or synthesized malware candidates 828 and variant candidates are operational, the malware analysis engine 104 executes an automated analysis to confirm that they are functional and malicious. Some systems outsource part of this functional analysis to external services such as the services provided by trade names: HYPERION, CUCKOO, and VOLATILITY. These external services develop an image of the file's control flow, API calls, and memory access. Since the adaptive malware rewriting system does not reverse-engineer each malware instance, the malware analysis engine 104 processes or compares the images generated by these services and internal and/or local functional analysis tools 816 to map the malware's behavior and/or functions. In use, an image is taken before (the instance is modified) and/or compared against the malware instance after it synthesized 828. If a change and/or a difference is detected in the image or input, the malware analysis engine 104 determines that a non-semantic alteration or other change likely damaged the malware. In some applications, malware that is damaged is discarded, and the alteration engine 108 executes a different alteration as the process repeats. The recursive process continues until the file, file-less instance, or input or samples originally classified as malware has successfully been altered so that it is classified as benign, possible alterations have been exhausted, and/or after a predetermined amount of time has lapsed.

When the synthesized malware candidates 828 and/or variant candidates are classified as benign and confirmed as operational, a target classifier engine 110 generates a vulnerability report 112, the malware profiles 818 are made available and the operational synthesized malware 822 are made available for training or used to generate malware training data. The actionable vulnerability report 112 identifies both critical vulnerabilities that should or may be further investigated and informational vulnerabilities that pose a lower risk to the targeted systems. Some vulnerability reports 112 further describe defensive measures that the targeted system may execute to defeat the validated synthesized malware 822, variants, and/or its family members, describe the targeted system's and its security policy vulnerabilities, etc.

Figure 2:
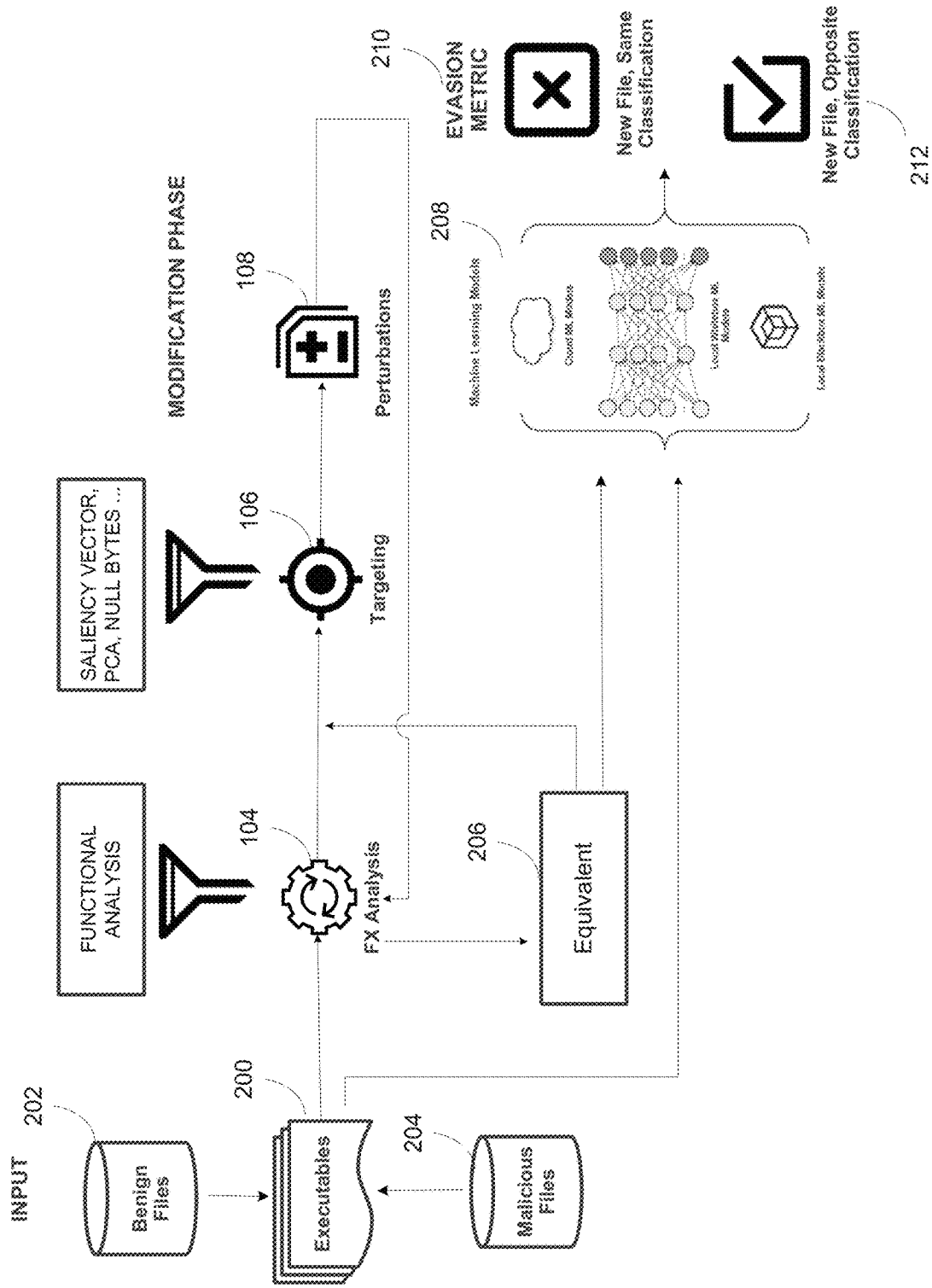
FIG. 2 is an adaptive malware rewriting system.

FIG. 2 is an adaptive malware rewriting system. In this system, the executables 200 comprise benign files 202 and malicious files 204. The executables 200 are processed by the malware analysis engine 104 that the confirms that the executables and synthesized malware candidates 828 are operational. Some systems execute the alternative functional analysis tools 816 and/or the outsource external functional analysis services described herein. In some applications, the malware analysis engine 104 develops a compressed file of the targeted system's operating system that captures the file's or malware instance's control flow, API calls, and memory maps and access routines. The malware analysis engine 104 processes the compressed file to map the malware's behavior and/or functions. In use, the compressed file is generated before (the malware or input is modified) and/or after the input and/or malware is modified. If substantial changes (e.g., more than a predetermined threshold) are detected or if an equivalents malware analysis engine 206 determines that the malware candidate is not equivalent, the malware analysis engine 206 determines that the executables and/or synthesized malware is likely damaged. In some applications, malware that is damaged is discarded, and the system executes a different alteration generated from the process shown in FIG. 1. This system continues to operate until the malware is not classified as malware by traditional malware detectors, determined to be equivalent to its native form and classified as benign (e.g., based on comparisons executed by the functional analysis tools 816 described herein), possible alterations have been exhausted, and/or a predetermined amount of time passed.

In FIG. 2, the targeting engine 106 optimizes the systems' identifications of malicious malware candidates 828 through the surrogate model. The surrogate model classifies files and/or file-less malware as either malicious or benign. Each input and altered instance is processed by the surrogate model that renders a malware classification score and/or a saliency vector. When the malware classification score is above a predetermined detection threshold, the surrogate model classifies the file or file-less malware as malicious. In this disclosure, file-less malware is code that does not require its own executable file on the targeted system's file system. It may be injected into a running process and execute or reside exclusively in random access memory.

The saliency vector expresses the weights the surrogate model assigns to each byte in the binary or stripped binary during the system's malware classification process. The greater the weight, the more influence the byte has on the malware classification score. By this system, individual bytes are altered to reduce the malware classification score. The objective of the targeting engine is to minimize the amount of alterations that the alteration engine performs to achieve the greatest shift in the malware classification score that is at or below the predetermined detection threshold. Once the malware classification score drops to or falls below the predetermined detection threshold, the surrogate model classifies the file or file-less instances as not malicious despite its malicious functionality. In FIG. 2, the targeting engine may also execute a dimensionality-reduction method that reduce the dimensionality of large synthesized malware sample candidate sample sets by transforming a large number of synthesized malware sample candidates into a smaller sample size based on random contractions that still contains the most viable synthesized malware candidates 828 and/or its variant candidates 822 to reduce the processing burden in classifying files and/or file-less malware as either malicious or benign. The targeting engine 106 is also responsive to string termination points (null bytes), which causes the targeting engine to stop its classifications.

In FIG. 2, the alteration engine 108 (also known as a perturbation engine and/or obfuscation engine) executes a binary instrumentation on the malware bytes prioritized by the saliency vector. Because some malware instances occur as binary and/or stripped binary rather than source code, the systems process binary inputs. Using functional analysis tools 816, the alteration engine 108 alters the binary inputs in their native state based on the functional analysis. The functional analysis tools 816 indicate where to alter the functional areas of the code and execute the alteration, which in some cases, significantly alter the malware. A stripped binary is a program compiled with a strip flag that told the compiler to discard the debugging symbols and compile the program as is. Stripping a binary reduces the size and makes it more difficult to reverse engineer.

Some functional analysis tools 816 trace API calls and general behavior of the file and distill the calls into high level information and signatures that are modified by some alteration engines 108. Some functional analysis tools 816 dump and analyze network traffic, even when encrypted with SSL/TLS. With native network routing support, some functional analysis tools 816 drop all traffic or route it through an Internet service simulation software and/or hardware suite, a network interface, or a virtual private network (VPN) that is modified by some alteration engines 108. Other functional analysis tools 816 execute advanced memory analysis and facilitate modifications by some alteration engines 108 of the infected system by executing an open source memory forensic framework through software as well facilitate processes and modifications patterns by using a memory granularity analysis using tools that also identify and classify malware samples. Other functional tools and alteration engines 108 execute behavior computations and modifications based on computational semantics.

When the synthesized malware candidates 828 and/or its variant candidates are classified as benign and confirmed as operational, an equivalents engine 206 transfers the validated synthesized malware 822 and/or its variants to cloud based and/or remote systems and/or processes that generate training data or use the validated synthesized malware 822 and/or its variants to train machine learning algorithms 820 to render machine learning models and/or dynamic behavior detectors 208 that detect malware, including malware designed to evade detection. The machine learning algorithms 820 render local, cloud-based, and other remote based machine learning models and/or dynamic behavior detectors 208 that can detect and defend against the synthesized malware 822 that include its variants, and/or family members that are traditionally classified as benign and generate evasion metrics 210 and new classifications 212. The evasion metrics 210 may identify both critical and informational vulnerabilities. Some evasion metrics 210 describe how the validated synthesized malware 822 evade prior detection, report on defensive measures that may be used to defeat the synthesized malware 822, describe the targeted system and its security policy vulnerabilities, etc.

Some adaptive malware rewriting systems are cloud-based and remote from one another; others are local and part of an enterprise processing platform. Each alternate system provides one or more specific advantage or particular purpose to solve a problem rather than serving as a design choice. Among the advantages and purposes are the benefits of reduced memory resources when adaptive malware rewriting systems use local processing engines and more processing power when one or more adaptive malware rewriting systems execute multiple processing simultaneously and/or nearly simultaneously in the cloud. Another advantage includes access to larger processing resources, larger scalability, and remote accessibility when adaptive malware rewriting systems are cloud-based and uninterrupted processing when adaptive malware rewriting occurs exclusively locally. There is very little or no network dependence or bandwidth restrictions when processing occurs locally. In some systems, both local and cloud-based adaptive malware rewriting provide the benefits and advantages described above and overcome the deficiencies described above. The term "cloud" refers to servers that are accessed over the Internet, and the software and databases instances that run on those servers. Cloud servers are located in data centers distributed across geographic regions.

Figure 3:
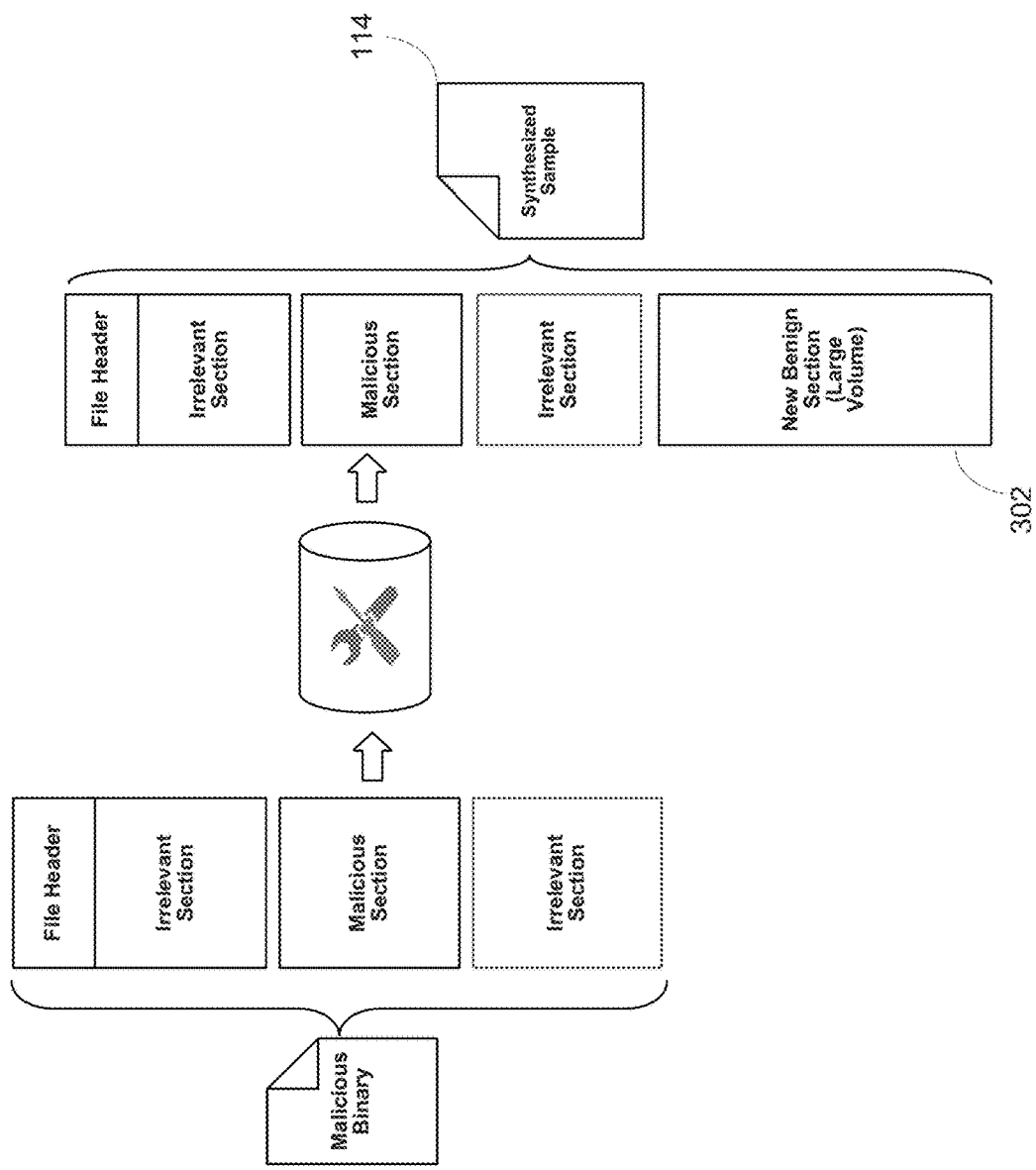
FIG. 3 is a block diagram restructuring malware code by appending data.

FIG. 3 is a block diagram restructuring code without changing the malicious code's observable behavior. To avoid static and dynamic detection, the alteration engine changes how the malicious binary file appears. In FIG. 3, the malicious code is obfuscated by appending a large benign section of code and/or random and/or predetermined data to the malicious code. The addition changes how the malicious binary instance looks compared to the original malicious binary instance.

Figure 4:
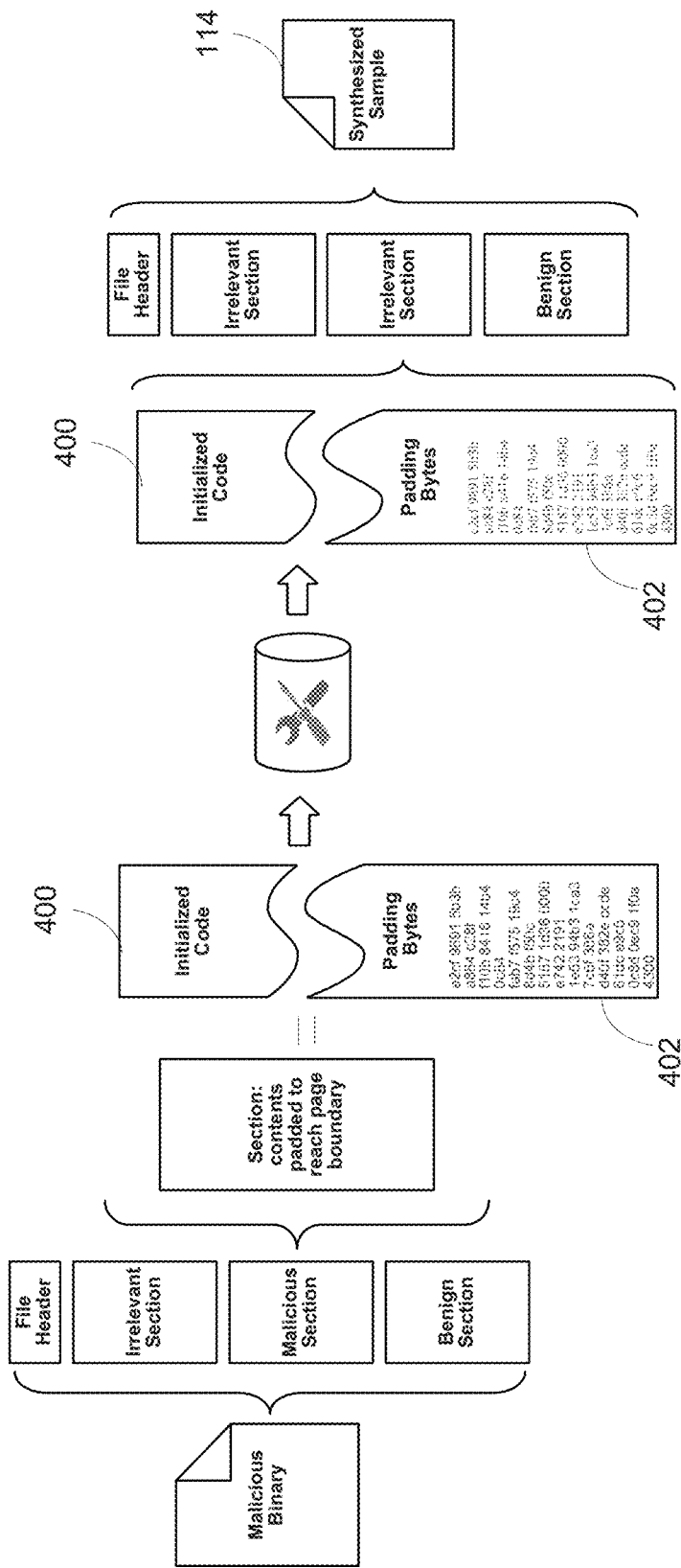
FIG. 4 is a block diagram restructuring malware code by padding bytes.

FIG. 4 is a block diagram restructuring code by padding bytes to change the representation of malware. By adding bytes 402 to the initialized code 400, the alteration engine 108 increases the size of the synthesized malware, that in some cases is beyond what some malware detectors are capable of handling. The addition may allow the synthesized malware to avoid detection by systems that detect malicious code by a hash-based and/or signature based analysis. By appending data and/or software code to an end or intermediate portion of the file or in-memory instance, the alteration engine 108 generates synthesized malware samples that bypass some traditional malware detectors and/or schemes that are not designed or capable of scanning, processing, and/or uploading large files.

Figure 5:
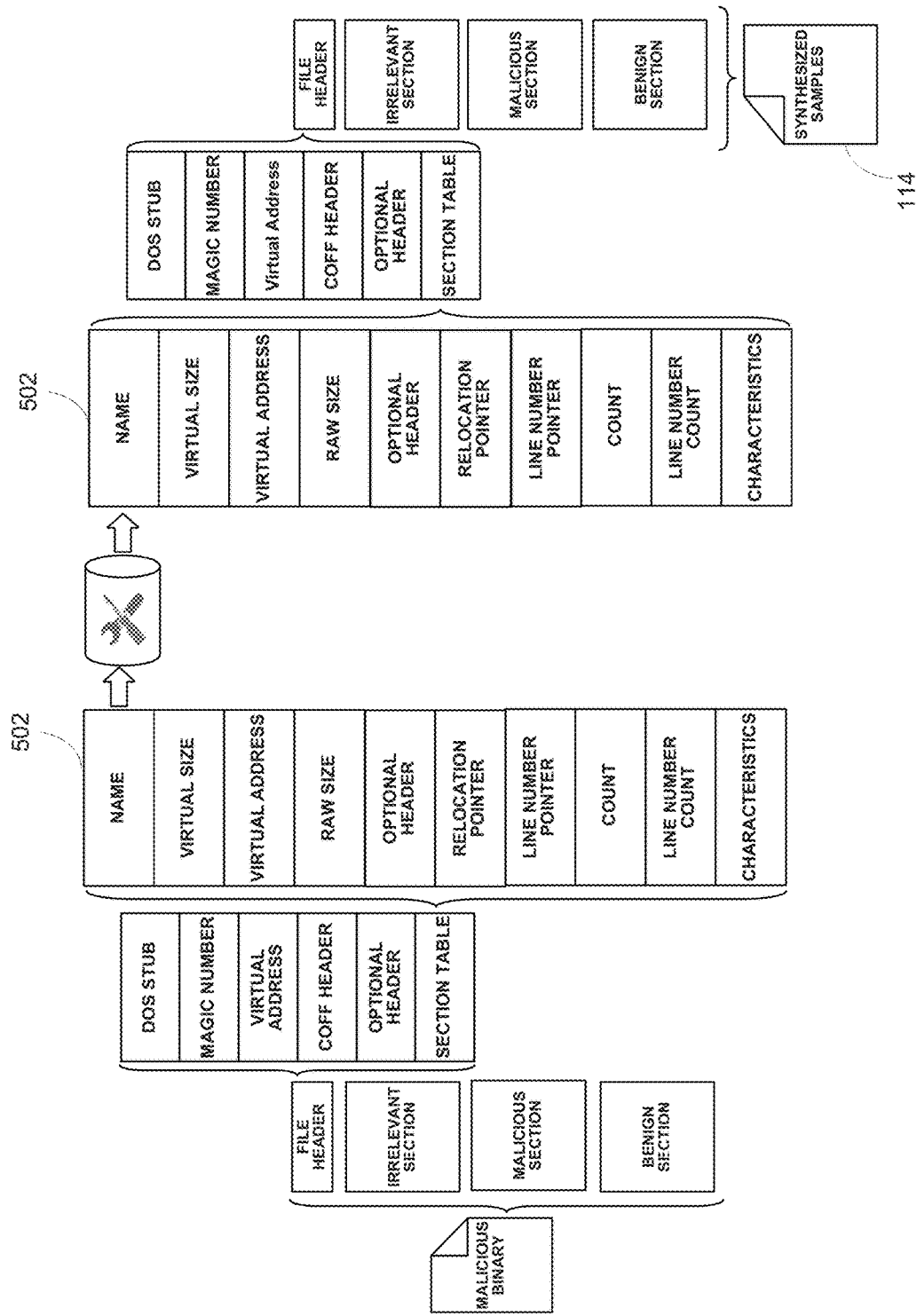
FIG. 5 is a block diagram restructuring malware code by renaming headers.

FIG. 5 is a block diagram restructuring code by renaming headers. The layout shows the structure of an executable (image) file and the object files under the WINDOWS family of operating systems. The DOS stub is an application that runs under the MS-DOS operating system. The optional MAGIC NUMBER determines whether the image is a type of an executable. The VIRTUAL ADDRESS is the address of an item after it is loaded into memory, with the base address of the image file subtracted from it. The COFF HEADER is the header for the common object file formation. The OPTIONAL HEADER provides information on the loader. The OPTIONAL HEADER is optional in the sense that some files (specifically, object files) do not have it. For image files, the OPTIONAL HEADER is required. An object file can have an OPTIONAL HEADER, but generally this header has no function in an object file except to increase its size. Each row of the SECTION TABLE is, in effect, a section header. The SECTION TABLE immediately follows the OPTIONAL HEADER. This positioning is required because the file header does not contain a direct pointer to the SECTION TABLE. Instead, the location of the SECTION TABLE is determined by calculating the location of the first byte after the headers.

The various entries of the SECTION TABLE include a NAME, which is an eight-byte null-padded Unicode Transformation Format encoded string and a VIRTUAL SIZE which is the total size of the section when loaded into memory. The VIRTUAL ADDRESS is the address of the first byte of the section relative to the image base when the section is loaded into memory for executable images. The RAW SIZE is the size of the section (for object files) or the size of the initialized data on disk (for image files). For executable images, this comprises a multiple of File Alignment from the OPTIONAL HEADER. The OPTIONAL HEADER contains general information that is useful for loading and running the executable file. The RELOCATION POINTER is the file pointer to the beginning of relocation entries for the section. It is set to zero for executable images or if there are no relocations. The LINE NUMBER POINTER is the file pointer to the beginning of line-number entries for the section. This is set to zero if there are no coff line numbers. The COUNT is the number of relocation entries for the section. This is set to zero for executable images. The LINE NUMBER COUNT is the number of line-number entries for the section. This value is zero for an image. CHARACTERISTICS are the flags that describe the characteristics of the section.

In FIG. 5, the NAME field 502 helps the operating system determine how to interpret the contents of the file. To avoid static and/or dynamic malware detections, some alteration engines 108 change and/or modify how the binary file instance appears, by changing the NAME field 502. By modifying the NAME field 502, the alteration engine 108 changes the matching binary string that it translates. Because executable images do not use a string table and do not support section names longer than eight characters, long names are truncated by the targeted system. Thus, while changing the name may allow the disclosed systems to evade traditional static and/or dynamic malware detection schemes without affecting the malicious behavior of the synthesized malware candidates 828.

Figure 6:
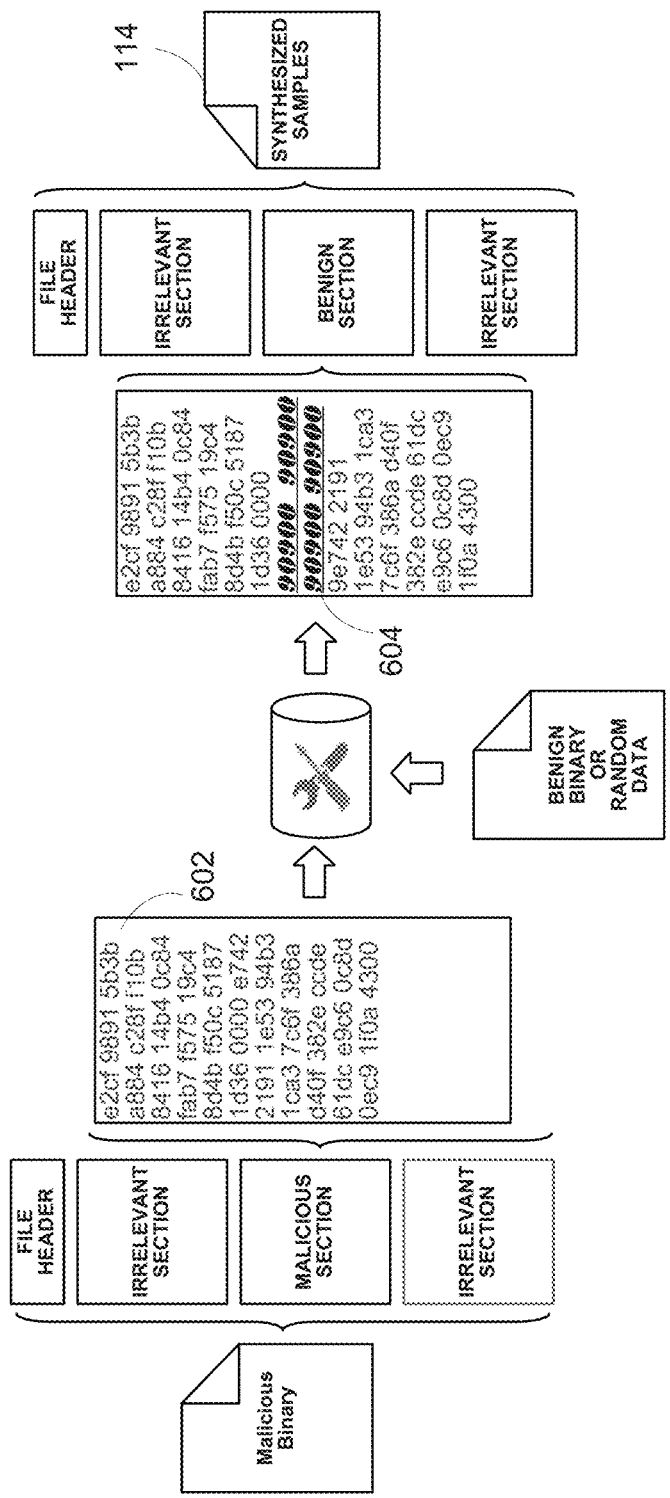
FIG. 6 is a block diagram restructuring malware code by inserting code blocks.

FIG. 6 is a block diagram restructuring code by code caving. This alteration engine's technique of injecting code avoids malware detection by dynamically introducing unused blocks of code 604 into the original malware executables 602. The placement of code within blocks preserves the malware's functionality while exploiting traditional malware detector's vulnerability to misclassify the modified code as benign. While an exemplary code placement shown in italics and underlined is inserted in an intermediate portion or mid-section of original malware code, in other applications optimization techniques place code and/or data in other positions of the original malware code.

Figure 7:
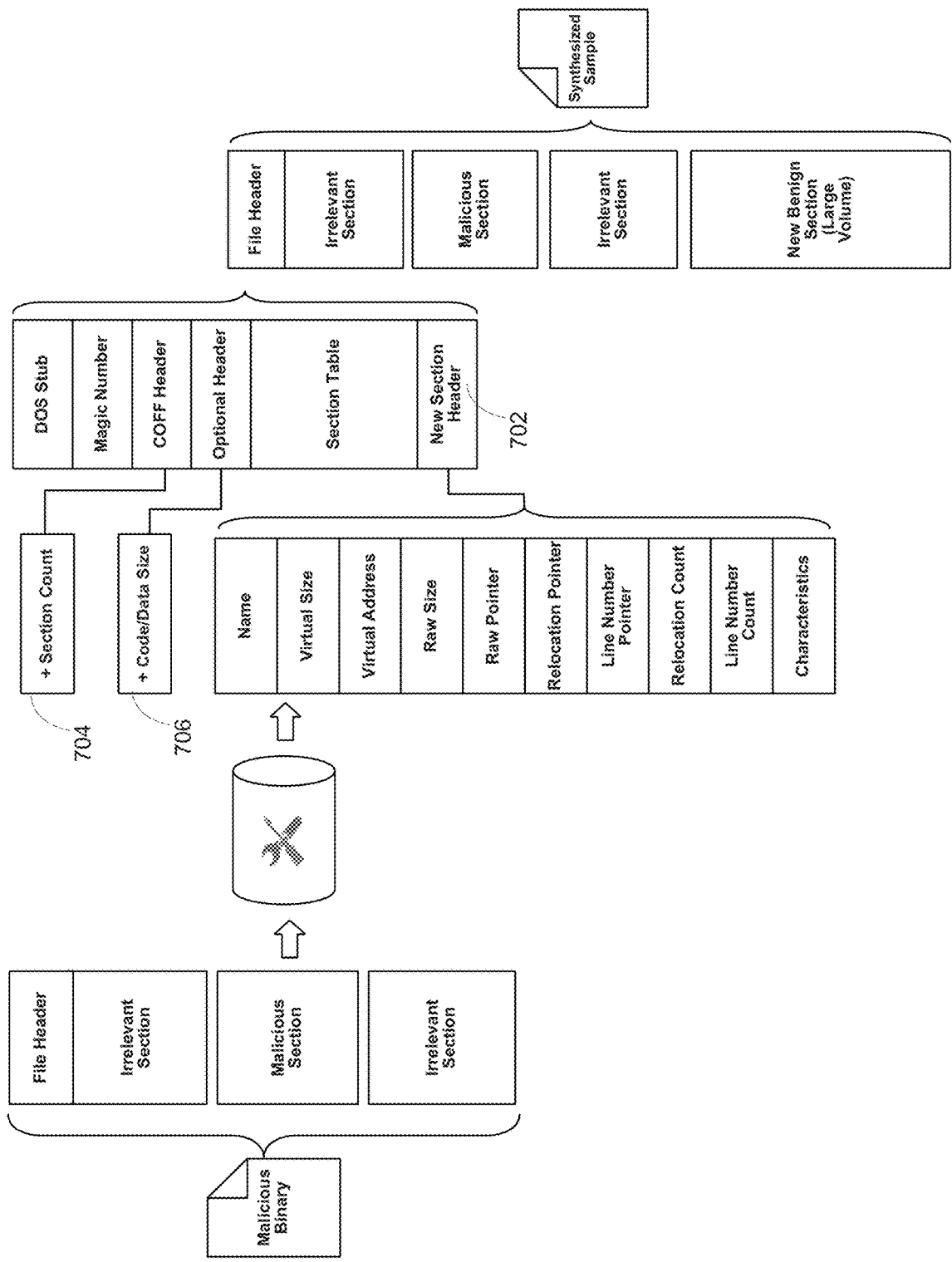
FIG. 7 is a block diagram restructuring malware code by appending new headers with corresponding data.

FIG. 7 is a block diagram restructuring malware code by appending section headers with corresponding data into code. The system avoids malware detection by appending one or more headers 702 into the malware code and increasing the code 704 and section 706 counts. The alteration engine's 108 modification is an effective way to introduce changes because the original malware is not modified and the binary files do not need to be updated. Because the injected header can be iteratively modified by the alteration engine 108 to minimize detection by traditional malware classifiers and/or detectors, the appended header can achieve misclassification by a loss function (e.g., a loss function evaluates how well the alteration engine 108 models a malware detector's misclassification) and an optimization function that minimizes the predicted loss calculated by the loss function and/or determines how close the modification results in a misclassification.

While traditional machine learning models do not provide a strong defense against an attack intentionally designed to cause misclassifications, training machine learning algorithms 820 on synthesized malware samples and/or variants and/or comparing input sampled attributed to information stored in malware profiles 818 minimize and/or prevent malware misclassifications. Similarly, a multi-system extraction that causes a first malware detector to predict (e.g., by percentages) the likelihood of an infection based on synthesized malware 822 that would traditionally be classified as benign combined with a second malware detector that dynamically tracks operating activities of the targeted system are more effective in classifying and/or stopping threats and/or isolating infected computers from healthy systems, and/or rolling back infected computers to preinfectional states.

FIG. 8 is an alternative adaptive malware rewriting system that may execute the process flows, functions, and execute the systems described herein and those shown in FIGS. 1-7. The system comprises one or more processor units 802 or graphical processor units (not shown), a non-transitory media such as a memory 804 (the contents of which are accessible by the one or more processors 802 and/or graphical processors). The input and output interface 806 connects devices and local and/or remote applications such as, for example, additional local and/or remote malware sources and/or resources and other input 808 and to external applications, devices, and one or more clouds. The memory 804 stores instructions, which when executed by the processors 802, causes the system to automatically render functionality that enables the creation and evaluation of malware and synthesized malware and/or its associated training data. It also generates vulnerability reports 112 and/or isolates and/or remediates infected targeted computer systems. More specifically, the memory 804 stores instructions, which when executed by the processors 802, causes the system to automatically execute the optimizing engine 812, the malware analysis engine 814, the targeting engine 816, the convolutional neural network 814, the functional analysis tools 816, the malware profiles and/or threat profiles 818, the alteration engines 824, the machine learning algorithms 820, equivalents engine 206, the synthesized malware 822, the malware candidates 828 (refers to the unvalidated malware instances), the knowledge base 824 and/or the inference engine 826.

The memory 804 and/or storage disclosed may retain an ordered listing of executable instructions for implementing the functions described above in a computer code or non-transitory machine readable medium. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random-Access Memory (RAM), a Read-Only Memory (ROM), an Erasable Programmable Read-Only Memory (EPROM or Flash memory), SSD, or a database management system. The memory 804 may comprise a single device or multiple devices that may be disposed in one or more dedicated memory devices or disposed in a processor or other similar device. The term "coupled" disclosed in this description encompasses both direct and indirect coupling. The term "engine" is intended to broadly encompass a processor or a portion of a program stored in a memory 804 that executes or supports events such as the modifying and/or evaluating malware. When functions, steps, etc. are "responsive to" or occur "in response to" another function or step, etc., the functions or steps necessarily occur as a result of another function or step, etc. A device or process that is responsive to another requires more than an action (i.e., the process and/or device's response to) merely follow another action. The term "substantially" or "about" encompasses a range that is largely, but not necessarily wholly, that which is specified. It encompasses all but a significant amount, such as within five percent. In other words, the terms "substantially" or "about" means equal to or at or within five percent of the expressed value. The term "critical" refers to weakness in a computer system's security procedures and administrative controls that can be exploited by a threat to gain unauthorized access to information on the computer or disrupt the computer's processing. The term "knowledge base" refers to part of an expert system that contains the facts, data, and/or rules to solve problems. The term "inference engine" refers to the processing portion of an expert system. It matches input propositions with facts, data, and/or rules contained in the knowledge base to derive conclusions, some alternative systems then act. The term "operational malware" refer to malware functioning as the malware is intended or designed to function.

Alternate systems are not limited to the particular hardware and algorithms described above. Other suitable hardware and algorithms can be used. Furthermore, the systems are not limited to generating file based or file-less malware instances. Rather, the systems can provide training against any undesired software and provide security for any systems across local and distributed networks. The systems illustratively disclosed herein suitably may be practiced in the absence of any element (including hardware, software, and/or functionality), and in the absence of some or all of the described functions association with a process step or component or structure that are expressly described. The systems may operate in the absence of one or more of these process steps, elements and/or any subset of the expressed functions. Further, the various elements described in each of the many systems described herein is regarded as divisible with regard to the individual elements described, rather than inseparable as a whole. In other words, alternate systems encompass any variation and combinations of elements, components, and process steps described herein and may be made, used, or executed without the various elements described (e.g., they may operate in the absence of) including those disclosed in the prior art but not expressed herein.

The adaptive malware rewriting systems protect computers from intrusive software and targeted attacks. The systems identify malware through machine learning algorithms and/or dynamic behavior tracking. The systems identify threats by generating new forms of malware and/or training data that identify malware instances, variants, and their families that are traditionally classified as benign. The modified malware and/or training data allow the systems to improve traditional detection schemes. By training the system's machine learning models and/or dynamic behavior tracking detectors on detected and/or synthesized malware variants that is traditionally classified as benign, the systems identify malware threats regardless of malicious software's traditional classifications.

The system's machine learning models detect and identify threats using dynamic models that process attributes extracted from file-less malicious activity and/or malicious file-based activity. Tuning on known, and/or synthesized malware that traditionally passes as undetected, the adaptive malware rewriting systems detect and identify malware registry changes, inter-process communications, network activities, changes in targeted systems' power consumption, changes in targeted systems' processing consumption, malware's start up sequences and/or malware's termination sequences, etc., that can be missed. When identifications occur in some systems, infected systems are automatically isolated and/or automatically returned or rolled back to pre-infection states to restore the infected systems to their prior uncompromised operating states in some targeted systems.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

The invention claimed is:
1. A non-transitory machine-readable medium encoded with machine-executable instructions, wherein execution of the machine-executable instructions is for:

processing a plurality of malware candidates in a binary form that disrupts, damages, or gains unauthorized access to a targeted computer;

classifying the plurality of malware candidates through a targeting engine as a malicious candidate or a benign candidate through a surrogate model;

where the surrogate model assigns a weight to each byte of the plurality of malware candidates through a saliency vector; and where a sum of the weight assigned to each byte of the plurality of malware candidates render a malware classification score;

altering the binary form of the plurality of malware candidates classified as the malicious candidate by an alteration engine that executes a plurality of functional analysis tools that trace application program interface calls and analyze a memory;

where the alteration engine alters the binary form of the plurality of malware candidates classified as the malicious until some of the plurality of malware candidates are classified as benign rendering a synthesized malware;

determining if the synthesized malware is operational by a malware analysis engine by comparing a plurality of images of the synthesized malware to an image of one of the plurality of malware candidates; and generating a vulnerability report by a target classifier engine that identifies a plurality of security vulnerabilities of the targeted computer.

2. The non-transitory machine-readable medium of claim 1, where the machine-executable instructions are executed repeatedly until some of the plurality of malware candidates are classified as benign.

3. The non-transitory machine-readable medium of claim 1, further comprising executing a dimensionality-reduction by the targeting engine that reduces a dimensionality of the plurality of malware candidates.

4. The non-transitory machine-readable medium of claim 1, where the binary form comprises a stripped binary form.

5. The non-transitory machine-readable medium of claim 1, where the targeting engine, the alteration engine, and the the malware analysis engine reside on a cloud.

6. The non-transitory machine-readable medium of claim 1, where the alteration engine obfuscates the plurality of malware candidates by appending a binary form of a benign code to an end portion of each of the plurality of malware candidates.

7. The non-transitory machine-readable medium of claim 1, where the alteration engine obfuscates the plurality of malware candidates by padding a plurality of bytes to a portion of each of the plurality of malware candidates.

8. The non-transitory machine-readable medium of claim 1, where the alteration engine obfuscates the plurality of malware candidates by modifying a binary form of an eight-byte null-padded Unicode Transformation Format field of each of the plurality of malware candidates.

9. The non-transitory machine-readable medium of claim 1, where the alteration engine obfuscates the plurality of malware candidates by injecting a binary form of a benign code within a mid-section of each of the plurality of malware candidates.

10. The non-transitory machine-readable medium of claim 1, where the alteration engine obfuscates the plurality of malware candidates by appending one or more binary headers into each of the plurality of malware candidates and increasing a code count and a section count of each of the plurality of malware candidates.

11. A process facilitated by a non-transitory machine-readable medium that generates a synthesized malware, comprising:

processing a plurality of malware candidates in a binary form that disrupt, damage, and/or gain unauthorized access to a targeted computer;

classifying the plurality of malware candidates through a targeting engine as a malicious candidate or a benign candidate through a surrogate model;

where the surrogate model assigns a weight to each byte of the plurality of malware candidates through a saliency vector; and where a sum of the weights assigned to each byte of the plurality of malware candidates render a malware classification score;

altering the binary form of the plurality of malware candidates classified as the malicious candidate by an alteration engine that executes a plurality of functional analysis tools that trace application program interface calls and analyze a memory;

where the alteration engine alters the binary form of each of the plurality of malware candidates classified as the malicious until some of the plurality of malware candidates are classified as benign rendering those plurality of malware candidates classified as benign a synthesized malware;

determining if the synthesized malware is operational by a malware analysis engine by comparing a plurality of images of the synthesized malware to one or more images of one of the plurality of malware candidates; and generating training data from the synthesized malware that is operational and a vulnerability report by a target classifier engine; where the vulnerability report identifies a plurality of security vulnerabilities of the targeted computer.

12. An adaptive malware writing system comprising a non-transitory machine-readable medium storing machine-executable instructions, wherein execution of the machine-executable instructions causes implementation of:

a targeting engine configured to classify a plurality of malware candidates that are operational as a malicious candidate or a benign candidate through a surrogate model;

where the surrogate model assigns a weight to each byte of the plurality of malware candidates through a saliency vector; and where a sum of the weight assigned to each byte of the plurality of malware candidates render a malware classification score;

an alteration engine configured to alter a binary form of the malware candidates classified as malicious by executing a plurality of functional analysis tools that trace application program interface calls and analyzing a memory that stores the malware candidates classified as malware;

where the alteration engine alters a binary form of the malware candidates classified as malicious until some of the plurality of malware candidates are classified as benign rendering those plurality of malware candidates classified as benign a synthesized malware;

a malware analysis engine programmed to determine if the synthesized malware is operational by comparing a plurality of images of the synthesized malware to an image of one of the plurality of malware candidates;

where the malware analysis engine discards the synthesized malware that is not operational;

a target classifier engine configured to identify a plurality of security vulnerabilities of a targeted computer and generate a training data from the synthesized malware that is operational.

13. The system of claim 12, where the targeting engine is further programmed to execute a dimensionality-reduction by the targeting engine that reduce the dimensionality of the plurality of malware candidates.

14. The system of claim 12, where the binary form comprises a stripped binary form.

15. The system of claim 12, where the targeting engine, the alteration engine, and the malware analysis engine reside on a cloud.

16. The system of claim 12, where the alteration engine obfuscates the plurality of malware candidates by appending a benign code to an end portion to the binary form of each of the plurality of malware candidates.

17. The system of claim 12, where the alteration engine obfuscates the plurality of malware candidates by padding bytes to a portion of the binary form of each of the plurality of malware candidates.

18. The system of claim 12, where the alteration engine obfuscates the plurality of malware candidates by modifying a binary form of an eight-byte null-padded Unicode Transformation Format field of each of the plurality of malware candidates.

19. The system of claim 12, where the alteration engine obfuscates the plurality of malware candidates by injecting a benign code within a mid-section of the binary form of each of the plurality of malware candidates.

20. The system claim 12 where the alteration engine obfuscates the plurality of malware candidates by appending one or more binary headers into each of the plurality of malware candidates and increasing a code count and a section count of the each of the plurality of malware candidates.

* * * * *